US012603192B2

(12) United States Patent
Esaki

(10) Patent No.: US 12,603,192 B2
(45) Date of Patent: *Apr. 14, 2026

(54) CONDUCTIVE RESIN COMPOSITION

(71) Applicant: SHOEI CHEMICAL INC., Tokyo (JP)

(72) Inventor: Soichiro Esaki, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/922,585

(22) PCT Filed: Apr. 23, 2021

(86) PCT No.: PCT/JP2021/016514
§ 371 (c)(1),
(2) Date: Oct. 31, 2022

(87) PCT Pub. No.: WO2021/220976
PCT Pub. Date: Nov. 4, 2021

(65) Prior Publication Data
US 2023/0170105 A1 Jun. 1, 2023

(30) Foreign Application Priority Data

May 1, 2020 (JP) ................................. 2020-081190
May 1, 2020 (JP) ................................. 2020-081191
(Continued)

(51) Int. Cl.
*H01B 1/04* (2006.01)
*H01G 9/042* (2006.01)
*H01G 9/048* (2006.01)

(52) U.S. Cl.
CPC ............... *H01B 1/04* (2013.01); *H01G 9/042* (2013.01); *H01G 9/048* (2013.01)

(58) Field of Classification Search
CPC ....................................................... H01B 1/04
See application file for complete search history.

(56) References Cited

U.S. PATENT DOCUMENTS

2014/0192453 A1 7/2014 Hong et al.
2015/0262728 A1* 9/2015 Ogiwara ................... H01B 1/22
252/514
(Continued)

FOREIGN PATENT DOCUMENTS

JP H11213756 A 8/1999
JP 2000133043 A 5/2000
(Continued)

OTHER PUBLICATIONS

Japan Patent Office, Office Action Issued in Application No. 2022-504007, Mar. 1, 2020, 8 pages.
(Continued)

*Primary Examiner* — William D Young
(74) *Attorney, Agent, or Firm* — Alleman Hall LLP

(57) ABSTRACT

A method for manufacturing an electronic component includes: a preparation step of preparing an electrode-forming body for electronic components; and an electrode forming step of forming an electrode on an outer surface of the electrode-forming body for electronic components, wherein in the electrode forming step, a conductive resin layer is formed on the electrode-forming body for electronic components by using a conductive resin composition containing a metal powder, a resin binder, and an organic solvent, wherein 20.0% by mass or more of the metal powder is a flaky metal powder, and 70.0% by mass or more of the resin binder is a silicone resin. According to the present invention, it is possible to provide a method for manufacturing an electronic component having reduced restrictions on design and manufacturing and high manufacturing efficiency, in addition to high moisture resistance.

15 Claims, 1 Drawing Sheet

(30)        Foreign Application Priority Data

May 19, 2020    (JP) ................................. 2020-087085
May 19, 2020    (JP) ................................. 2020-087086

(56)              References Cited

U.S. PATENT DOCUMENTS

| | | | |
|---|---|---|---|
| 2016/0017185 A1* | 1/2016 | Albaugh | C08K 9/10 |
| | | | 252/514 |
| 2018/0182907 A1* | 6/2018 | Zhang | H01L 31/1884 |
| 2021/0155819 A1* | 5/2021 | Kobayashi | H01L 31/022466 |
| 2022/0110569 A1* | 4/2022 | Hatakeyama | A61B 5/268 |
| 2022/0228015 A1* | 7/2022 | Matsubara | C09D 11/108 |

FOREIGN PATENT DOCUMENTS

| | | | |
|---|---|---|---|
| JP | 2000215729 A | 8/2000 | |
| JP | 2004168966 A | 6/2004 | |
| JP | 2007157434 A | 6/2007 | |
| JP | 2009295602 A | 12/2009 | |
| JP | 2010209152 A | 9/2010 | |
| JP | 2011100573 A | 5/2011 | |
| JP | 5246207 B2 | 7/2013 | |
| JP | 2014135463 A | 7/2014 | |
| JP | 2016004659 A | 1/2016 | |
| JP | 2019102719 A | 6/2019 | |
| WO | 03035739 A1 | 5/2003 | |
| WO | 2016104232 A1 | 10/2017 | |

OTHER PUBLICATIONS

China National Intellectual Property Administration, Office Action and Search Report Issued in Application No. 202180032455.X, Sep. 20, 2024, 15 pages.
European Patent Office, Extended European Search Report Issued in Application No. 21797474.0, Nov. 21, 2024, Germany, 9 pages.
Korean Intellectual Property Office, Office Action Issued in Application No. 10-2022-7040843, Aug. 1, 2025, Korea, 11 Pages.

* cited by examiner

CONDUCTIVE RESIN COMPOSITION

TECHNICAL FIELD

The present invention relates to a conductive resin composition for forming an electrode of an electronic component, the conductive resin composition used in the formation of an electrode on an electrode-forming body for electronic components, such as a laminated body for a multilayer electronic component or a cathode-forming body for a solid electrolytic capacitor, to manufacture the electronic component. The present invention also relates to a method for manufacturing an electronic component using the conductive resin composition.

BACKGROUND ART

In recent years, electronic devices have increasingly been used in environments more severe than before, and thus electronic components mounted on the electronic devices are also required not to fail even when used in the environments more severe than before.

Specifically, for example, in the case of a mobile device such as a smartphone, high impact resistance is required so that even when the mobile device is dropped and subjected to an impact, an electronic component thereof does not fall off from a substrate due to cracks or interfacial peeling in a connecting portion between the substrate and the electronic component or an electronic component thereof does not crack itself.

In addition, in the case of an electronic device mounted on an automobile, the electronic device is also required to have high impact resistance so that even when being subjected to an impact due to vibration during driving, an electronic component thereof does not fall off from a substrate due to cracks or interfacial peeling in a connecting portion between the substrate and the electronic component or an electronic component thereof does not crack itself.

Patent Literature 1 discloses a multilayer electronic component with an external electronic electrode in which a conductive resin layer is formed on an underlying metal layer formed by plating. Since the conductive resin layer is formed on the underlying metal layer in this multilayer electronic component, even if a substrate having the multilayer electronic component mounted thereon is bent, the conductive resin layer relaxes the stress, thereby suppressing the occurrence of cracks.

As a conductive resin composition used to form an conductive resin layer, a conductive resin containing an epoxy resin having excellent heat resistance, moisture resistance, and adhesiveness has conventionally been used. For example, Patent Literature 2 discloses a conductive resin composition containing a conductive filler, a chelate-forming substance, a phenol resin, a modified epoxy resin, and a boron compound.

CITATION LIST

Patent Literature

[Patent Literature 1] Japanese Patent Laid-Open No. 2009-295602
[Patent Literature 2] International Publication No. WO 2016/104232

SUMMARY OF INVENTION

Technical Problem

A mobile device or an automobile may be exposed to a high humidity environment, and thus electronic components mounted on the mobile device or the automobile are required to have high moisture resistance reliability so as to prevent moisture from entering the inside.

However, a conductive resin layer formed of a conductive resin composition containing an epoxy resin as a main component of a resin component is insufficient for high moisture resistance required for an electronic component used in a mobile device and an automobile, although the layer has a certain degree of moisture resistance.

In addition, if the conductive resin composition containing the epoxy resin as the main component of the resin component is used, it is necessary to adjust flexibility by blending a butyral with the epoxy resin, and thus restrictions on design arise.

Therefore, the first object of the present invention is to provide a conductive resin composition for forming an electrode of an electronic component having high moisture resistance. The second object of the present invention is to provide a conductive resin composition for forming an electrode of an electronic component having reduced restrictions on design and manufacturing and high manufacturing efficiency, in addition to high moisture resistance.

Solution to Problem

As a result of intensive studies to solve the problems above, the present inventors have found that a conductive resin layer is formed on an electrode-forming body for electronic components by using a conductive resin composition containing a predetermined amount of a silicone resin as a resin binder, thereby producing an electronic component having excellent moisture resistance and reduced restrictions on design compared with the case of using a conductive resin composition containing an epoxy resin as a main component of the resin binder, and thus have completed the present invention.

In other words, the present invention (1) provides a method for manufacturing an electronic component, including: a preparation step f preparing an electrode-forming body for electronic components; and an electrode forming step of forming an electrode on an outer surface of the electrode-forming body for electronic components, wherein:

in the electrode forming step, a conductive resin layer is formed on the electrode-forming body for electronic components by using a conductive resin composition containing a metal powder, a resin binder, and an organic solvent, wherein 20.0% by mass or more of the metal powder is a flaky metal powder, and 70.0% by mass or more of the resin binder is a silicone resin.

The present invention (2) provides a conductive resin composition containing a metal powder, a resin binder, and an organic solvent, wherein 20.0% by mass or more of the metal powder is a flaky metal powder, and 70.0% by mass or more of the resin binder is a silicone resin.

The present invention (3) provides the conductive resin composition according to (2), wherein 80.0% by mass or more of the resin binder is a silicone resin.

The present invention (4) provides the conductive resin composition according to (2) or (3), wherein a content of the resin binder is 2.5 to 35.0 parts by mass with respect to 100.0 parts by mass of the metal powder.

The present invention (5) provides the conductive resin composition according to any of (2) to (4), wherein the silicone resin has an epoxy group.

The present invention (6) provides the conductive resin composition according to any of (2) to (4), wherein the silicone resin has a hydroxy group.

The present invention (7) provides the conductive resin composition according to any of (2) to (4), wherein the silicone resin is a thermosetting silicone resin.

The present invention (8) provides the conductive resin composition according to any of (2) to (7), wherein more than 0.0% by mass and 20.0% by mass or less of the resin binder is an epoxy resin.

The present invention (9) provides the conductive resin composition according to any of (2) to (8), wherein the flaky metal powder has an aspect ratio of 1.5 to 50.0.

The present invention (10) provides the conductive resin composition according to any one of (2) to (9), wherein the metal powder is at least one or more powders selected from: one or more powders of silver, copper, nickel, palladium, platinum, gold, and aluminum; a powder containing an alloy of one or more of these metals; a silver-coated copper powder; and a silver-coated nickel powder.

The present invention (11) provides the conductive resin composition according to any of (2) to (10), further containing a plasticizer.

The present invention (12) provides the conductive resin composition according to any of (2) to (11), wherein when 1% strain is applied to the conductive resin composition at an angular frequency of 1 Hz, a value of a phase difference δ between the strain and a stress caused by the strain is in a range of 32 to 88°.

The present invention (13) provides the conductive resin composition according to any of (2) to (12), wherein a ratio of a viscosity of the conductive resin composition at a shear rate of 0.4 (1/s) to a viscosity thereof at a shear rate of 40 (1/s) is in a range of 1.4 to 60.0.

The present invention (14) provides the conductive resin composition according to any of (2) to (13), which is for forming an external electrode of a multilayer electronic component.

The present invention (15) provides the conductive resin composition according to any of (2) to (13), which is for forming a cathode of a solid electrolytic capacitor.

The present invention (16) provides the conductive resin composition according to (14), which is for dip printing.

The present invention (17) provides the conductive resin composition according to any of (2) to (16), wherein a moisture permeation amount determined in the following moisture permeation amount measurement test is 80.0 mg or less.

<Moisture Permeation Amount Measurement Test>

The conductive resin composition is cast on a PET film to a thickness of 250 μm and cured under the conditions of 200° C. for 60 minutes. The resulting cured film is cut into a 7.5 mm circle and fixed with an adhesive so as to cover a 5 ml glass bottle containing 2 g of silica gel. The glass bottle is placed in a 750 ml vessel containing 100 ml of purified water so that the cured film does not come into contact with the purified water. The vessel is then sealed and placed in a dryer at 65° C. to be left for 15 hours. Subsequently, the moisture permeation amount is calculated by the following equation (1):

Moisture permeation amount (weight increase)
=weight of the glass bottle after being placed in
the dryer−weight of the glass bottle before
being placed in the dryer     (1).

The present invention (18) is the conductive resin composition according to (3) containing a metal powder, a resin binder, and an organic solvent, wherein:

the content of the resin binder is 5.0 to 25.0 parts by mass with respect to 100.0 parts by mass of the metal powder;

80.0% by mass or more of the resin binder is a silicone resin;

20.0% by mass or more of the metal powder is a flaky metal powder;

when 1% strain is applied to the conductive resin composition at an angular frequency of 1 Hz, a value of a phase difference δ between the strain and a stress caused by the strain is in a range of 45 to 87°; and a ratio of a viscosity of the conductive resin composition at a shear rate of 0.4 (1/s) to a viscosity thereof at a shear rate of 40 (1/s) is in a range of 1.5 to 20.0.

Advantageous Effects of Invention

According to the present invention, it is possible to provide a conductive resin composition for forming an electrode of an electronic component having high moisture resistance. In addition, according to the present invention, it is possible to provide a conductive resin composition for forming an electrode of an electronic component having reduced restrictions on design and manufacturing and high manufacturing efficiency, in addition to high moisture resistance.

DESCRIPTION OF EMBODIMENTS

The conductive resin composition of the present invention is a conductive resin composition containing a metal powder, a resin binder, and an organic solvent, wherein 20.0% by mass or more of the metal powder is a flaky metal powder, and 70.0% by mass or more of the resin binder is a silicone resin.

Figure 1:
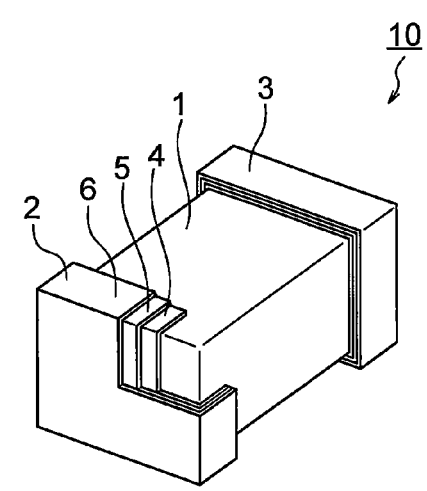
FIG. 1 is a schematic perspective view illustrating a multilayer electronic component.
Figure 2:
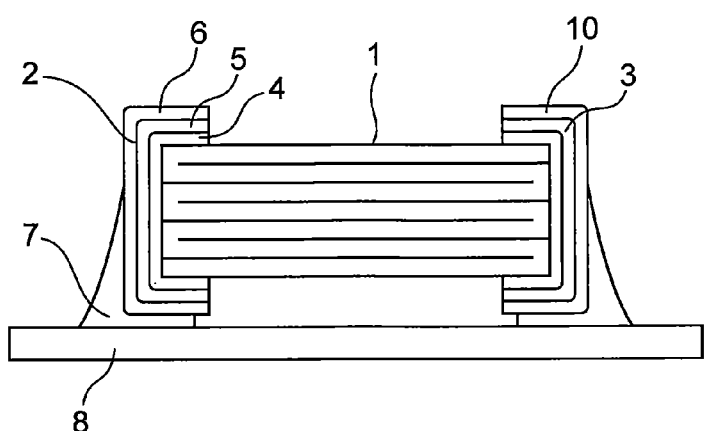
FIG. 2 is a schematic cross-sectional view illustrating a multilayer electronic component mounted on a substrate.

An electronic component of an embodiment obtained by using an embodiment of the conductive resin composition of the present invention will be described with reference to FIGS. 1 and 2. FIG. 1 is a schematic perspective view illustrating a multilayer electronic component. FIG. 2 is a schematic cross-sectional view illustrating a multilayer electronic component mounted on a substrate. A multilayer electronic component 10 is composed of: a laminated body 1 for a multilayer electronic component formed of a plurality of ceramic layers and a plurality of internal electrode layers; and external terminal electrodes 2 and 3 formed on the outer surfaces of both ends of the laminated body 1 for the multilayer electronic component and electrically connected to the internal electrode layers. Each of the external terminal electrodes 2 and 3 is composed of: a metal layer 4 formed on the outer surface of the laminated body 1 for the multilayer electronic component; a conductive resin layer 5 formed on the surface of the metal layer 4; and a plating layer 6 formed on the surface of the conductive resin layer 5. In short, the conductive resin layer 5 is disposed between the metal layer 4 and the plating layer 6 in each of the external terminal electrodes 2 and 3. The multilayer electronic component 10 is mounted on a substrate 8 by solder 7.

The conductive resin composition of the present invention contains a metal powder, a resin binder, and an organic solvent.

The conductive resin composition of the present invention contains the metal powder as a conductive material. Examples of the metal powder include a powder containing one or more of silver powder, copper powder, nickel powder, palladium powder, platinum powder, gold powder, and aluminum powder; a powder containing an alloy of one or more of silver, copper, nickel, palladium, platinum, gold, and aluminum; a silver-coated copper powder; and a silver-coated nickel powder.

In the conductive resin composition of the present invention, 20.0% by mass or more of the total metal powder is a flaky metal powder. The content ratio of the flaky metal powder with respect to the entire metal powder is 20.0 to 100.0% by mass, preferably 40.0 to 100.0% by mass, and particularly preferably 60.0 to 100.0% by mass. When the content ratio of the flaky metal powder with respect to the entire metal powder is in the above range, the conductivity and adhesiveness of the conductive resin layer to be obtained are enhanced.

An aspect ratio of the flaky metal powder is preferably 1.5 to 50.0, further preferably 2.0 to 30.0, and particularly preferably 5.0 to 20.0. When the aspect ratio of the flaky metal powder is in the above range, the conductivity and adhesiveness of the conductive resin layer to be obtained are enhanced. Note that in the present invention, the aspect ratio of the flaky metal powder is determined by measuring aspect ratios of 50 metal powders arbitrarily selected in observation of scanning electron microscope (SEM) images with the particle diameter relative to the particle thickness (particle diameter/thickness) as the aspect ratio and calculating an average value thereof.

The number average particle diameter of the flaky metal powder measured using a scanning electron microscope (SEM) is preferably 0.1 to 20.0 $\mu$m, more preferably 0.3 to 15.0 $\mu$m, further preferably 0.5 to 10.0 $\mu$m, and particularly preferably 1.0 to 5.0 $\mu$m. When the number average particle diameter of the flaky metal powder is in the above range, the conductivity and adhesiveness of the conductive resin layer to be obtained are enhanced. Note that in the present invention, the number average particle diameter of the flaky metal powder when measured using a scanning electron microscope (SEM) is determined by measuring the particle diameters of 50 metal powders arbitrarily selected in observation of scanning electron microscope (SEM) images with the diameter of the longest part of the particle as the particle diameter and calculating an average value thereof as the number average particle diameter.

The specific surface area of the flaky metal powder is preferably 0.5 to 5.0 $m^2$/g and particularly preferably 0.6 to 4.0 $m^2$/g. When the specific surface area of the flaky metal powder is in the above range, the conductivity and adhesiveness of the conductive resin layer to be obtained are enhanced.

The metal powder contains a flaky metal powder and a spherical metal powder, and it is preferable that "the content ratio of the spherical metal powder with respect to the entire metal powder is 80.0% by mass or less, and the content of the flaky metal powder with respect to the entire metal powder is 20.0% by mass or more," and particularly preferable that "the content ratio of the spherical metal powder with respect to the entire metal powder is 60.0% by mass or less, and the content of the flaky metal powder with respect to the entire metal powder is 40.0% by mass or more." When the content ratios of the flaky metal powder and the spherical metal powder are in the above ranges, the conductivity and adhesiveness of the conductive resin layer to be obtained are enhanced.

The volume-based cumulative 50% particle diameter ($D_{50}$) of the spherical metal powder is preferably 0.01 to 7.0 $\mu$m, and particularly preferably 0.03 to 5.0 $\mu$m. When the $D_{50}$ of the spherical metal powder is in the above range, the conductivity and adhesiveness of the resulting conductive resin layer are enhanced. Note that in the present invention, the $D_{50}$ is determined as a 50% value in a volume-based integrated fraction ($D_{50}$) using a laser diffraction particle size distribution analyzer.

The specific surface area of the spherical metal powder is preferably 0.2 to 3.0 $m^2$/g and particularly preferably 0.3 to 2.5 $m^2$/g. When the specific surface area of the spherical metal powder is in the above range, the conductivity and adhesiveness of the resulting conductive resin layer are enhanced.

The conductive resin composition of the present invention contains at least a silicone resin as a resin binder.

In the conductive resin composition of the present invention, 70.0% by mass or more of the total resin binder is a silicone resin. In the conductive resin composition of the present invention, the content ratio of the silicone resin with respect to the total resin binder is 70.0 to 100.0% by mass, preferably 80.0 to 100.0% by mass, more preferably 90.0 to 100.0% by mass, and particularly preferably 95.0 to 100.0% by mass. When the conductive resin composition contains the silicone resin in the above range, the moisture resistance of the conductive resin layer becomes high while the rate of change in moisture permeability with respect to the change in film thickness becomes small, thereby reducing restrictions on design and increasing formability. Therefore, manufacturing efficiency can be increased. Examples of the silicone resin include a thermosetting silicone resin and a thermoplastic silicone resin. Among them, a thermosetting silicone resin is preferred. Examples of the thermosetting silicone resin include a self-curable resin, which is cured by heating without using a curing agent, and a curing agent-curable resin, which is cured with a curing agent. Examples of the self-curable silicone resin include a silicone resin that has a hydroxy group as a reactive functional group and is cured through a dehydration reaction upon heating. In addition, examples of the curing agent-curable silicone resin include a silicone resin that is cured by adding a catalyst and heating to cause a crosslinking reaction by a hydrocarbon group such as an alkenyl group.

The thermosetting silicone resin is not particularly limited, and examples thereof include resins whose skeleton portion has a structure such as a silicone oligomer, organosiloxane, diorganosiloxane, organopolysiloxane, and diorganopolysiloxane, and one or more reactive functional groups. As the skeleton portion of the curable silicone resin, organopolysiloxane and diorganopolysiloxane are preferred from the viewpoint of increasing the moisture resistance of the conductive resin layer. The skeleton portion of the thermosetting silicone resin may be linear or branched.

The reactive functional group of the thermosetting silicone resin is not particularly limited, and examples thereof include a hydroxy group, an alkenyl group, a hydrogensilyl group, a (meth)acryloyl group, an epoxy group, an amino group, a carbinol group, a mercapto group, a carboxy group, and a phenol group. As the reactive functional group of the thermosetting silicone resin, a hydroxy group and an alkenyl group are preferred from the viewpoint of moisture resistance, and an epoxy group is preferred from the viewpoint of adhesiveness.

The thermosetting silicone resin may have a functional group such as an alkyl group or an aromatic group on a side chain, in addition to the reactive functional group. As the side chain of the thermosetting silicone resin, a methyl group and a phenyl group are preferred from the viewpoint of increasing the moisture resistance of the conductive resin layer.

The curing the agent for curing agent-curable thermosetting silicone resin is not particularly limited, and examples thereof include a platinum-based curing agent, a titanium-based curing agent, an aluminum-based curing agent, a zinc-based curing agent, an iron-based curing agent, and a phosphoric acid-based curing agent. If the silicone resin has an epoxy group as a reactive functional group of the thermosetting silicone resin, a known curing agent used for an epoxy resin can be used, and examples thereof include an amine-based curing agent such as ethylenediamine, an organic acid such as oxalic acid, and an acid anhydride such as phthalic anhydride.

The molecular weight (weight average molecular weight Mw) of the thermosetting silicone resin is not particularly limited, but is preferably 1000 to 300000, and particularly preferably 2000 to 200000.

The conductive resin composition of the present invention may contain a resin binder other than the silicone resin as long as the effects of the present invention are not impaired. Examples of the resin binder other than the silicone resin include an epoxy resin, a butyral resin, an acetal resin, an acrylic resin, a polybutadiene-based resin, a cellulose-based resin, a (meth)acrylic resin, a styrene resin, a phenol resin, a polyurethane resin, a polyamide resin, a polyimide resin, a polyamide-imide resin, and alkyd resins.

If the conductive resin composition of the present invention contains an epoxy resin, the content ratio of the epoxy resin to the total resin binder ((epoxy resin/total resin binder (silicone resin+resin other than silicone resin))×100) is preferably 25.0% by mass or less, more preferably 20.0% by mass or less, still more preferably 10% by mass or less, further preferably 5.0% by mass or less, and particularly preferably 0.0% by mass. When the content ratio of the epoxy resin to the total resin binder in the conductive resin composition is in the above range, the moisture resistance of the conductive resin layer becomes high while the rate of change in moisture permeation amount with respect to the change in film thickness can be reduced, thereby reducing restrictions on design of an electronic component. In addition, the formability is increased, thereby increasing the manufacturing efficiency.

If the conductive resin layer is required to have high adhesion, the conductive resin composition of the present invention may contain an epoxy resin having a content ratio of the epoxy resin to the total resin binder ((epoxy resin/total resin binder (silicone resin+resin other than silicone resin))× 100) of preferably more than 0.0% by mass and 20.0% by mass or less, more preferably more than 0.0% by mass and 10.0% by mass or less, and further preferably more than 0.0% by mass and 5.0% by mass or less. When the content ratio of the epoxy resin to the total resin binder in the conductive resin composition is in the above range, the adhesion of the conductive resin layer can be improved while the moisture resistance of the conductive resin layer is maintained at a high level.

If the conductive resin composition of the present invention contains an butyral resin, the content ratio of the butyral resin to the total resin binder ((butyral resin/total resin binder (silicone resin+resin other than silicone resin))×100) is preferably 20.0% by mass or less, more preferably 10.0% by mass or less, further preferably 5.0% by mass or less, and particularly preferably 0.0% by mass. When the content ratio of the butyral resin to the total resin binder in the conductive resin composition is in the above range, the moisture resistance of the conductive resin layer becomes high while the rate of change in moisture permeation amount with respect to the change in film thickness can be reduced, thereby reducing restrictions on design and manufacturing of an electronic component.

In the conductive resin composition of the present invention, the content of the resin binder (the content of the total resin binder (silicone resin+resin other than silicone resin)) is preferably 2.5 to 35.0 parts by mass, more preferably 5.0 to 25.0 parts by mass, still more preferably 7.0 to 23.0 parts by mass, and particularly preferably 11.0 to 20.0 parts by mass with respect to 100.0 parts by mass of the metal powder from the viewpoints of increasing the conductivity and adhesiveness of the resulting conductive resin layer and obtaining a rheology suitable for the dip method. In addition, if the conductive resin composition of the present invention is applied to a cathode-forming body for a solid electrolytic capacitor to form a conductive resin layer, the content of the resin binder (the content of the total resin binder (silicone resin+resin other than silicone resin)) may be 2.5 to 35.0 parts by mass, preferably 5.0 to 25.0 parts by mass, more preferably 7.0 to 23.0 parts by mass, and particularly preferably 11.0 to 20.0 parts by mass with respect to 100.0 parts by mass of the metal powder from the viewpoints of increasing the conductivity and adhesiveness of the resulting conductive resin layer and obtaining a rheology suitable for the dip method. Moreover, if the conductive resin composition of the present invention is applied to a laminated body for a multilayer electronic component to form a conductive resin layer, the content of the resin binder (the content of the total resin binder (silicone resin+resin other than silicone resin)) is preferably 5.0 to 25.0 parts by mass, more preferably 7.0 to 23.0 parts by mass, and particularly preferably 11.0 to 20.0 parts by mass with respect to 100.0 parts by mass of the metal powder from the viewpoints of increasing the conductivity and adhesiveness of the resulting conductive resin layer and obtaining a rheology suitable for the dip method.

If the conductive resin composition of the present invention contains a curing agent, the content of the curing agent in the conductive resin composition is appropriately selected depending on the content of the thermosetting resin in the conductive resin composition, and is usually 0.01 to 10.0% by mass.

The organic solvent according to the conductive resin composition of the present invention is not particularly limited, and examples thereof include terpineol, dihydroterpineol, dihydroterpineol acetate, secondary butyl alcohol, butyl carbitol, butyl carbitol acetate, and benzyl alcohol.

The conductive resin composition of the present invention may contain additives such as an antifoaming agent, a plasticizer, a dispersant, and a rheology modifier, if necessary, in addition to the components described above. Examples of the plasticizer include dimethyl phthalate, diethyl phthalate, dibutyl phthalate, di-2-ethylhexyl phthalate, di-n-octyl phthalate, butyl benzyl phthalate, dioctyl adipate, diisononyl adipate, dibutyl sebacate, diethyl sebacate, dioctyl sebacate, tricresyl phosphate, chlorinated paraffin, and diisononyl cyclohexane 1,2-dicarboxylate (DINCH).

The conductive resin composition of the present invention is suitably used for forming a cathode of a solid electrolytic capacitor and for dip printing of a laminated body for a multilayer electronic component. Examples of the rheology modifier include a silica powder. If the conductive resin composition of the present invention contains a silica powder, the content of the silica powder in the conductive resin composition of the present invention is preferably 0.0 to 3.0 parts by mass, and particularly preferably 0.0 to 2.0 parts by mass with respect to 100 parts by mass of the metal powder.

The content of the organic solvent in the conductive resin composition of the present invention is appropriately selected depending on the types and contents of the metal powder and resin binder, and the rheology required for each application. Preferably, the content of the organic solvent is appropriately selected so that when 1% strain is applied to the conductive resin composition at an angular frequency of 1 Hz, a value of the phase difference δ between the strain and a stress caused by the strain is in a predetermined range; and the ratio of the viscosity of the conductive resin composition at a shear rate of 0.4 (1/s) to the viscosity thereof at a shear rate of 40 (1/s) is in a predetermined range.

When 1% strain is applied to the conductive resin composition of the present invention at an angular frequency of 1 Hz, the value of the phase difference δ between the strain and the stress caused by the strain is preferably in the range of 32 to 88°, more preferably in the range of 43 to 88°, still more preferably in the range of 45 to 87°, even more preferably in the range of 47 to 85°, particularly preferably in the range of 49 to 83°, and further preferably in the range of 51 to 81°. When the value of the phase difference δ of the conductive resin composition is in the above range, the formability when an electrode is formed on the electrode-forming body for electronic components by using the conductive resin composition becomes high.

Especially, if the conductive resin composition of the present invention is used to form an external electrode on a laminated body for a multilayer electronic component by a dip method, the value of the phase difference δ described above is not particularly limited, but the lower limit thereof is preferably 45° or more, more preferably 47° or more, particularly preferably 49° or more, further preferably 50° or more, and still further preferably 51° or more from the viewpoint of increasing the formability. The upper limit thereof is preferably 87° or less, more preferably 85° or less, particularly preferably 83° or less, further preferably 81° or less, and still further preferably 80° or less from the viewpoint of increasing the formability. Note that the upper limit and the lower limit of the phase difference δ can be arbitrarily combined. The value of the phase difference δ described above is, for example, preferably in the range of 45 to 87°, more preferably in the range of 47 to 85°, particularly preferably in the range of 49 to 83°, further preferably in the range of 51 to 81° from the viewpoint of increasing the formability.

In particular, if the conductive resin composition of the present invention is used to form a cathode on the cathode-forming body for the solid electrolytic capacitor by the dip method, the value of the phase difference δ described above is not particularly limited, but the lower limit thereof is preferably 32° or more, more preferably 37° or more, still more preferably 45° or more, even more preferably 47° or more, particularly preferably 49° or more, and further preferably 51° or more from the viewpoint of increasing the formability. The upper limit thereof is preferably 87° or less, more preferably 85° or less, particularly preferably 83° or less, further preferably 81° or less, and still further preferably 80° or less from the viewpoint of increasing the formability. Note that the upper limit and the lower limit of the phase difference δ can be arbitrarily combined. The value of the phase difference δ described above is, for example, preferably in the range of 32 to 87°, more preferably in the range of 37 to 87°, still more preferably in the range of 45 to 87°, even more preferably in the range of 47 to 85°, particularly preferably in the range of 49 to 83°, and further preferably in the range of 51 to 81° from the viewpoint of increasing the formability.

The value of the phase difference δ of the conductive resin composition of the present invention is measured using a rheometer (manufactured by TA instruments Japan Inc., model number: AR2000) under the conditions of 25° C., an angular frequency of 1 Hz, and a strain of 1% with a parallel plate having a diameter of 40 mm. Examples of a method for adjusting the phase difference δ of the conductive resin composition of the present invention to the above range include adjusting the ratio (mass ratio) of the spherical powder, the flaky powder, the resin, and the solvent in the conductive resin composition; and adding a rheology modifier.

From the viewpoint of increasing the formability when an electrode is formed on the electrode-forming body for electronic components by using the conductive resin composition, the lower limit of the ratio of the viscosity of the conductive resin composition of the present invention at a shear rate of 0.4 (1/s) to the viscosity thereof at a shear rate of 40 (1/s) is preferably 1.4 or more, more preferably 1.5 or more, still more preferably 2.0 or more, and particularly preferably 2.5 or more. In addition, the upper limit of the ratio of the viscosity of the conductive resin composition at a shear rate of 0.4 (1/s) to the viscosity thereof at a shear rate of 40 (1/s) is preferably 60.0 or less, more preferably 30.0 or less, still more preferably 20.0 or less, and particularly preferably 15.0 or less. Moreover, when 1% strain is applied to the conductive resin composition at an angular frequency of 1 Hz, the ratio of the viscosity of the conductive resin composition of the present invention at a shear rate of 0.4 (1/s) to the viscosity thereof at a shear rate of 40 (1/s) is, for example, preferably in the range of 1.4 to 60.0, more preferably in the range of 1.5 to 60.0, still more preferably in the range of 1.5 to 30.0, even more preferably in the range of 2.0 to 20.0, further preferably in the range of 2.5 to 20.0, particularly preferably in the range of 2.5 to 15.0, and still further preferably in the range of 3.0 to 15.0, from the viewpoint of increasing the formability when an electrode is formed on the electrode-forming body for electronic components by using the conductive resin composition.

Especially, if the conductive composition of the present invention is used to form an external electrode on a laminated body for a multilayer electronic component by a dip method, the ratio of the viscosity described above is not particularly limited, but the lower limit thereof is preferably 1.5 or more, more preferably 2.0 or more, and particularly preferably 2.5 or more, and the upper limit thereof is preferably 20.0 or less, more preferably 15.0 or less, and particularly preferably 12.0 or less, from the viewpoint of increasing the formability. The ratio of the viscosity described above is, for example, preferably in the range of 1.5 to 20.0, more preferably in the range of 2.0 to 20.0, particularly preferably in the range of 2.5 to 15.0, and further preferably in the range of 2.5 to 12.0, from the viewpoint of increasing the formability.

Moreover, especially if the conductive resin composition of the present invention is used to form a cathode on the cathode-forming body for the solid electrolytic capacitor by the dip method, the ratio of the viscosity described above is not particularly limited, but the lower limit thereof is preferably 1.5 or more, more preferably 2.0 or more, and particularly preferably 2.5 or more, and the upper limit thereof is preferably 60.0 or less, more preferably 50.0 or less, still more preferably 35.0 or less, even more preferably 20.0 or less, and particularly preferably 15.0 or less, from the viewpoint of increasing the formability. The ratio of the viscosity described above is, for example, preferably in the range of 1.5 to 60.0, more preferably in the range of 2.0 to 50.0, still more preferably in the range of 2.0 to 35.0, even more preferably in the range of 2.0 to 20.0, and particularly preferably in the range of 2.5 to 15.0, from the viewpoint of increasing the formability.

The ratio of the viscosity of the conductive resin composition of the present invention is calculated as a ratio of the viscosity at a shear rate of 0.4 (1/s) to the viscosity thereof at a shear rate of 40 (1/s) by measuring the viscosity at 25° C. under the conditions of a shear rate of 0.4 (1/s) and a shear rate of 40 (1/s) using a rotational viscometer (manufactured by Brookfield Engineering Laboratories, Inc., model number: HADV-II+Pro). Examples of a method for adjusting the ratio of the viscosity of the present invention to the above range include adjusting the ratio (mass ratio) of the spherical powder, the flaky powder, the resin, and the solvent in the conductive resin composition; and adding a rheology modifier.

The moisture permeation amount determined in the following moisture permeation amount measurement test for the conductive resin composition of the present invention is 80.0 mg or less, preferably 40.0 mg or less, and more preferably 20.0 mg or less. When the moisture permeation amount determined in the moisture permeation amount measurement test is in the above range, an electronic component having excellent moisture resistance is obtained if a conductive resin layer is formed using the conductive resin composition of the present invention.

<Moisture Permeation Amount Measurement Test>

The conductive resin composition is cast on a PET film to a thickness of 250 μm and cured under the conditions of 200° C. for 60 minutes. The resulting cured film is cut into a circle of 7.5 mm in diameter and fixed with an adhesive so as to cover a 5 ml glass bottle containing 2 g of silica gel. The glass bottle is placed in a 750 ml vessel containing 100 ml of purified water so that the cured film does not come into contact with the purified water. The vessel is then sealed and placed in a dryer at 65° C. to be left for 15 hours. Subsequently, the moisture permeation amount is calculated by the following equation (1):

$$\text{Moisture permeation amount (weight increase)}$$
$$= \text{weight of the glass bottle after being placed in the dryer} - \text{weight of the glass bottle before being placed in the dryer} \quad (1).$$

Among the conductive resin compositions of the present invention, the conductive resin composition of the first embodiment of the present invention described below has high formability when an electrode is formed on an electrode-forming body for electronic components using the conductive resin composition, and particularly has high formability when a conductive resin layer is formed on a laminated body for a multilayer electronic component by a dip method.

The conductive resin composition according to the first embodiment of the present invention is a conductive resin composition containing a metal powder, a resin binder, and an organic solvent, wherein:

the content of the resin binder is 5.0 to 25.0 parts by mass with respect to 100.0 parts by mass of the metal powder;

80.0% by mass or more of the resin binder is a silicone resin;

20.0% by mass or more of the metal powder is a flaky metal powder; when 1% strain is applied to the conductive resin composition at an angular frequency of 1 Hz, a value of a phase difference δ between the strain and a stress caused by the strain is in a range of 45 to 87°; and a ratio of a viscosity of the conductive resin composition at a shear rate of 0.4 (1/s) to a viscosity thereof at a shear rate of 40 (1/s) is in a range of 1.5 to 20.0.

The metal powder, the flaky metal powder, the spherical metal powder, the resin binder, the silicone resin, the thermosetting silicone resin, the curing agent, the thermoplastic silicone resin, the resin binder other than the silicone resin, the epoxy resin, the butyral resin, the organic solvent, and the additives such as the antifoaming agent, the plasticizer, the dispersant, and the rheology modifier, which are used if necessary, according to the conductive resin composition of the first embodiment of the present invention are the same as those of the conductive resin composition of the present invention above.

In the conductive resin composition of the first embodiment of the present invention, 20.0% by mass or more of the total metal powder is a flaky metal powder. The content ratio of the flaky metal powder with respect to the entire metal powder is 20.0 to 100.0% by mass, preferably 40.0 to 100.0% by mass, and particularly preferably 60.0 to 100.0% by mass. When the content ratio of the flaky metal powder with respect to the entire metal powder is in the above range, the conductivity and adhesiveness of the resulting conductive resin layer are enhanced.

In the conductive resin composition of the first embodiment of the present invention, 80.0% by mass or more of the total resin binder is a silicone resin. In the conductive resin composition of the first embodiment of the present invention, the content ratio of the silicone resin with respect to the total resin binder is preferably 80.0 to 100.0% by mass, more preferably 90.0 to 100.0% by mass, and particularly preferably 95.0 to 100.0% by mass. When the conductive resin composition contains the silicone resin in the above range, the moisture resistance of the conductive resin layer becomes high while the rate of change in moisture permeability with respect to the change in film thickness becomes small, thereby reducing restrictions on design and increasing formability. Therefore, manufacturing efficiency can be increased.

If the conductive resin composition of the first embodiment of the present invention contains an epoxy resin, the content ratio of the epoxy resin to the total resin binder ((epoxy resin/total resin binder (silicone resin+resin other than silicone resin))×100) is preferably 25.0% by mass or less, more preferably 20.0% by mass or less, still more preferably 10% by mass or less, further preferably 5.0% by mass or less, and particularly preferably 0.0% by mass. When the content ratio of the epoxy resin to the total resin binder in the conductive resin composition is in the above range, the moisture resistance of the conductive resin layer becomes high while the rate of change in moisture permeation amount with respect to the change in film thickness can be reduced, thereby reducing restrictions on design of an electronic component. In addition, the formability is increased, thereby increasing the manufacturing efficiency.

If the conductive resin layer is required to have high adhesion, the conductive resin composition of the first embodiment of the present invention may contain an epoxy resin having a content ratio of the epoxy resin to the total resin binder ((epoxy resin/total resin binder (silicone resin+ resin other than silicone resin))×100) of preferably more than 0.0% by mass and 20.0% by mass or less, more preferably more than 0.0% by mass and 10% by mass or less, and further preferably more than 0.0% by mass and 5.0% by mass or less. When the content ratio of the epoxy resin to the total resin binder in the conductive resin composition is in the above range, the adhesion of the conductive resin layer can be improved while the moisture resistance of the conductive resin layer is maintained at a high level.

If the conductive resin composition of the first embodiment of the present invention contains an butyral resin, the content ratio of the butyral resin to the total resin binder ((butyral resin/total resin binder (silicone resin+resin other than silicone resin))×100) is preferably 20.0% by mass or less, more preferably 10.0% by mass or less, further preferably 5.0% by mass or less, and particularly preferably 0.0% by mass. When the content ratio of the butyral resin to the total resin binder in the conductive resin composition is in the above range, the moisture resistance of the conductive resin layer becomes high while the rate of change in moisture permeation amount with respect to the change in film thickness can be reduced, thereby reducing restrictions on design and manufacturing of an electronic component.

In the conductive resin composition of the first embodiment of the present invention, the content of the resin binder (the content of the total resin binder (silicone resin+resin other than silicone resin)) is 5.0 to 25.0 parts by mass, preferably 7.0 to 23.0 parts by mass, and particularly preferably 11.0 to 20.0 parts by mass with respect to 100.0 parts by mass of the metal powder. When the content of the resin component in the conductive resin composition is in the above range, the conductivity and adhesiveness of the resulting conductive resin layer are enhanced, and the rheology is suitable for the dip method.

When the conductive resin composition of the first embodiment of the present invention contains a thermosetting resin as the silicone resin, the composition may contain a curing agent. If the conductive resin composition of the first embodiment of the present invention contains a curing agent, the content of the curing agent in the conductive resin composition is appropriately selected depending on the content of the thermosetting resin in the conductive resin composition, and is usually 0.01 to 10.0% by mass.

The conductive resin composition of the first embodiment of the present invention may contain additives such as an antifoaming agent, a plasticizer, a dispersant, and a rheology modifier, if necessary, in addition to the components described above. Examples of the plasticizer include dimethyl phthalate, diethyl phthalate, dibutyl phthalate, di-2-ethylhexyl phthalate, di-n-octyl phthalate, butyl benzyl phthalate, dioctyl adipate, diisononyl adipate, dibutyl sebacate, diethyl sebacate, dioctyl sebacate, tricresyl phosphate, chlorinated paraffin, and diisononyl cyclohexane 1,2-dicarboxylate (DINCH). Examples of the rheology modifier include a silica powder. If the conductive resin composition of the present invention contains a silica powder, the content of the silica powder in the conductive resin composition of the present invention is preferably 0.0 to 3.0 parts by mass, and particularly preferably 0.0 to 2.0 parts by mass with respect to 100 parts by mass of the metal powder.

When 1% strain is applied to the conductive resin composition of the first embodiment of the present invention at an angular frequency of 1 Hz, a value of the phase difference δ between the strain and a stress caused by the strain is in the range of 45 to 87°, preferably in the range of 47 to 85°, particularly preferably in the range of 49 to 83°, and further preferably in the range of 51 to 81°. When the value of the phase difference δ is in the above range, the formability becomes high when an electrode is formed on the electrode-forming body for electronic components by using the conductive resin composition.

The ratio of the viscosity of the conductive resin composition of the first embodiment of the present invention at a shear rate of 0.4 (1/s) to the viscosity thereof at a shear rate of 40 (1/s) is in the range of 1.5 to 20.0, preferably in the range of 2.0 to 20.0, and more preferably in the range of 2.5 to 15.0. When the ratio of the viscosity is in the above range, the formability becomes high when an electrode is formed on an electrode-forming body for electronic components by using the conductive resin composition, and particularly when a conductive resin layer is formed on a laminated body for a multilayer electronic component by a dip method.

The conductive resin composition of the present invention (including the conductive resin composition of the first embodiment of the present invention) is suitable as a conductive resin composition for forming an electrode on an electrode-forming body on which an electrode is formed (hereinafter, also referred to as an electrode-forming body for electronic components) in the manufacture of an electronic component. In addition, the conductive resin composition of the present invention (including the conductive resin composition of the first embodiment of the present invention) is particularly suitable as a conductive resin composition for forming an electrode of an external electrode of a laminated body for a multilayer electronic component.

The method for manufacturing an electronic component of the present invention is a method for manufacturing an electronic component by forming an electrode on the electronic component using the conductive resin composition of the present invention (including the conductive resin composition of the first embodiment of the present invention) and includes: a preparation step of preparing an electrode-forming body for electronic components; and an electrode forming step of forming an electrode on an outer surface of the electrode-forming body for electronic components. In the electrode forming step, a conductive resin layer is formed on the electrode-forming body for electronic components by using the conductive resin composition of the present invention to form the electrode.

The method for manufacturing an electronic component of the present invention includes:

a preparation step of preparing an electrode-forming body for electronic components; and an electrode forming step of forming an electrode on an outer surface of the electrode-forming body for electronic components, wherein in the electrode forming step, a conductive resin layer is formed on the electrode-forming body for electronic components by using a conductive resin composition containing a metal powder, a resin binder, and an organic solvent, wherein 20.0% by mass or more of the metal powder is a flaky metal powder, and 70.0% by mass or more of the resin binder is a silicone resin.

The preparation step is a step of preparing an electrode-forming body for electronic components. The electrode-forming body for electronic components refers to an object on which an electrode is formed in a manufacturing process of an electronic component. Examples of the electrode-forming body for electronic components include: a laminated body for a multilayer electronic component formed of a plurality of ceramic layers and a plurality of internal electrode layers; a cathode-forming body for a solid electrolytic capacitor composed of an anode and a dielectric layer formed on a surface of the anode; and an electrode-forming body for a chip resistor with an end surface electrode.

The laminated body for the multilayer electronic component is formed of a plurality of ceramic layers and a plurality of internal electrode layers. In the laminated body for the multilayer electronic component, adjacent ceramic layers are connected to each other by an internal electrode layer interposed therebetween. Examples of the laminated body for the multilayer electronic component include a laminated body for a multilayer ceramic capacitor, a laminated body for a multilayer ceramic inductor, and a laminated body for a piezoelectric actuator.

Examples of substances forming the ceramic layers that constitute the laminated body for the multilayer electronic component include barium titanate, strontium titanate, calcium titanate, barium zirconate, strontium zirconate, calcium zirconate, and strontium calcium zirconate.

Examples of substances forming the internal electrode layers that constitute the laminated body for the multilayer electronic component include any one of nickel, palladium, silver, copper, gold, and the like, or an alloy containing one or more of these metals (for example, an alloy of silver and palladium).

The cathode-forming body for the solid electrolytic capacitor is composed of an anode and a dielectric layer formed on the surface of the anode. Examples of combinations of substances forming the anode and the dielectric layer include tantalum and tantalum pentoxide, aluminum and aluminum oxide, and niobium and niobium pentoxide.

The electrode forming step is a step of forming an electrode on the outer surface of the electrode-forming body for electronic components. Note that in the present invention, the formation of the conductive resin layer on the electrode-forming body for electronic components includes both a case where the conductive resin layer is directly formed on the surface of the electrode-forming body for electronic components and a case where another layer or a film (for example, a metal layer or a conductor layer) is first formed on the electrode-forming body for electronic components and then the conductive resin layer is formed on the surface thereof. Therefore, in the electronic component obtained by the method for manufacturing an electronic component of the present invention, there are both cases where the conductive resin layer is directly formed on the surface of the electrode-forming body for electronic components and where the conductive resin layer is formed with another layer or a film (for example, a metal layer or a conductor layer) interposed between electrode-forming bodies for electronic components.

In the electrode forming step, the position and method of forming the electrode, the thickness of the electrode, the number of electrodes, the type of metal constituting the electrode, the shape of the metal powders used in the formation of the electrode, and the like are appropriately selected depending on the electronic component to be manufactured.

In the electrode forming step, a conductive resin layer is formed on the electrode-forming body for electronic components by using the conductive resin composition of the present invention.

In the electrode forming step, the conductive resin composition of the present invention is applied to the electrode-forming body for electronic components to form a layer of the conductive resin composition of the present invention at a predetermined position of the electrode-forming body for electronic components, and then the conductive resin composition of the present invention is cured to form a conductive resin layer.

In the electrode forming step, the conductive resin layer can be directly formed on the surface of the electrode-forming body for electronic components by applying the conductive resin composition of the present invention to the surface of the electrode-forming body for electronic components. In addition, the electrode forming step may include an appropriate step depending on the type of the electronic component before the conductive resin layer is formed on the electrode-forming body for electronic components. For example, in the case of a multilayer electronic component, in the electrode forming step, after a metal layer is formed at a predetermined position of the electrode-forming body for electronic components, the conductive resin composition of the present invention is applied to the surface of the metal layer to form a layer of the conductive resin composition of the present invention at a predetermined position of the electrode-forming body for electronic components, and then the conductive resin composition of the present invention is cured to form a conductive resin layer on the surface of the metal layer. Moreover, for example, in the case of a solid electrolytic capacitor, in the electrode forming step, a conductive layer composed of a carbon layer is formed at a predetermined position of the cathode-forming body for a solid electrolytic capacitor, the conductive resin composition of the present invention is applied to the surface of the conductive layer to form a conductive resin composition layer of the present invention at a predetermined position of the electrode-forming body for electronic components, the conductive resin composition of the present invention is cured to form a conductive resin layer on the surface of the conductive layer. In addition, the electrode forming step may include an appropriate step depending on the type of the electronic component after the conductive resin layer is formed on the electrode-forming body for electronic components. For example, in the case of a multilayer electronic component, in the electrode forming step, a conductive resin layer is formed at a predetermined position of the electrode-forming body for electronic components, and then a plating layer is formed on the surface of the conductive resin layer.

In the electrode forming step, an electrode can be formed by forming a conductive resin layer on the electrode-forming body for electronic components. In short, in this embodiment, the electrode is composed of only the conductive resin layer.

In the electrode forming step, when the conductive resin layer is formed on the electrode-forming body for electronic components using the conductive resin composition of the present invention, the conductive resin composition of the present invention can be applied to the electrode-forming body for electronic components by a dip method to form a layer of the conductive resin composition of the present invention at a predetermined position of the electrode-forming body for electronic components. Since the conductive resin composition of the present invention has excellent formability, the layer of the conductive resin composition of the present invention can be rapidly formed at a predetermined position by the dip method. Therefore, according to the conductive resin composition of the present invention, it is possible to increase the manufacturing efficiency by applying the conductive resin composition of the present invention to the electrode-forming body for electronic components by the dip method.

A first embodiment of the electrode forming step (hereinafter, also referred to as electrode forming step (1)) is an electrode forming step in the case where the electrode-forming body for electronic components is a laminated body for a multilayer electronic component formed of a ceramic layer and an internal electrode layer. The electrode forming step (1) includes at least a conductive resin layer forming step (1A) of forming a conductive resin layer on the outer surface of the laminated body for the multilayer electronic component using the conductive resin composition of the present invention. The electrode forming step (1) is not particularly limited as long as the step includes the conductive resin layer forming step (1A) of forming a conductive-resin layer on the outer surfaces of the laminated body for the multilayer electronic component using the conductive resin composition of the present invention, and examples thereof include an electrode forming step (1) including at least a metal layer forming step, a conductive resin layer forming step (1A), and a plating layer forming step.

The metal layer forming step is a step of forming a metal layer electrically connected to the internal electrode layer on the outer surface of the laminated body for the multilayer electronic component. Examples of the metal for forming a metal layer include at least one of Cu, Ag, Pd, Ni, Sn, Al, Au, and Pt, and an alloy containing at least one of these metals. The method for forming the metal layer is not particularly limited, and examples thereof include a dip method, a plating method, a roll coating method, a screen printing method, and a sputtering method. The thickness, shape, position, number, and the like of the metal layer are appropriately selected.

The conductive resin layer forming step (1A) is a step of forming a conductive resin layer on the surface of the metal layer formed in the metal layer forming step by using the conductive resin composition of the present invention.

In the conductive resin layer forming step (1A), the conductive resin composition of the present invention is applied to the surface of the metal layer formed in the metal layer forming step to form a layer of the conductive resin composition of the present invention on the metal layer, and then the conductive resin composition of the present invention is cured to form the conductive resin layer. The method for forming the layer of the conductive resin composition of the present invention is not particularly limited, and examples thereof include a dip method, a screen printing method, and a roll coating method. Among them, the dip method is preferred. The thickness, shape, position, number and the like of the layer of the conductive resin composition of the present invention are appropriately selected.

The plating layer forming step is a step of forming a plating layer on the surface of the conductive resin layer. Examples of the metal forming a plating layer include at least one of Ni, Cu, Sn, Ag, and Au, and an alloy containing at least one of these metals. The method for forming the plating layer is not particularly limited, and examples thereof include electrolytic plating and electroless plating. The thickness, shape, position, number, and the like of the plating layer are appropriately selected.

A second embodiment of the electrode forming step (hereinafter, also referred to as electrode forming step (2)) is an electrode forming step in the case where the electrode-forming body for electronic components is a cathode-forming body for a solid electrolytic capacitor. The electrode forming step (2) includes at least a conductive resin layer forming step (2A) of forming a conductive resin layer on the outer surface of the cathode-forming body for the solid electrolytic capacitor using the conductive resin composition of the present invention. The electrode forming step (2) is not particularly limited as long as the step includes the conductive resin layer forming step (2A) of forming the conductive resin layer on the outer surface of the cathode-forming body for the solid electrolytic capacitor using the conductive resin composition of the present invention, and examples thereof include an electrode forming step (2) including at least a solid electrolyte layer forming step, a carbon layer forming step, and a conductive resin layer forming step (2A).

The solid electrolyte layer forming step is a step of forming a solid electrolyte layer on the outer surface of the cathode-forming body for the solid electrolytic capacitor. The method for forming the solid electrolyte layer is not particularly limited, and the solid electrolyte layer can be formed by a known solid electrolyte manufactured by a chemical method. Examples of the solid electrolyte include conductive polymers such as polypyrrole, polyaniline, polythiophene, and polyacetylene.

The carbon layer forming step is a step of forming a carbon layer on the solid electrolyte layer. The method for forming the carbon layer is not particularly limited, and examples thereof include a method of drying and/or curing a carbon paste containing a resin, a solvent, and a carbon powder after applying the paste onto the solid electrolyte layer by a dip method. The carbon powder is not particularly limited, but a graphite powder is preferred.

The conductive resin layer forming step (2A) is a step of forming a conductive resin layer on the carbon layer using a conductive resin composition containing a silicone resin. The method for forming the conductive resin layer is not particularly limited, and examples thereof include a method in which a conductive resin composition containing a silicone resin is applied by a dip method, a screen printing method, a roll coating method, or the like, and then the conductive resin composition containing a silicone resin is cured.

Another embodiment of the electrode forming step includes an electrode forming step (3) in the case where the electrode-forming body for electronic components is an electrode-forming body for a chip resistor with an end surface electrode. The electrode forming step (3) includes at least a step of forming a conductive resin layer on the end surface electrode. The method for forming the conductive resin layer is not particularly limited, and examples thereof include a method in which a conductive resin composition containing a silicone resin is applied by a dip method, a screen printing method, a roll coating method, or the like, and then the conductive resin composition containing a silicone resin is cured. The electrode-forming body for the chip resistor with an end surface electrode includes, for example, an insulating substrate, a pair of upper surface electrodes formed on the insulating substrate, a resistor formed between the pair of upper surface electrodes, a protective layer formed so as to cover a part of the pair of upper surface electrodes and the resistor, and an end surface electrode formed on an end surface of the insulating substrate.

Another embodiment of the electrode forming step includes an electrode forming step (4) in the case where the electrode-forming body for electronic components is a substrate. The electrode forming step (4) includes at least a step of forming a conductive resin layer on the substrate. The method for forming the conductive resin layer is not particularly limited, and examples thereof include a method in which a conductive resin composition containing a silicone resin is applied by screen printing, inkjet printing, or dispenser printing, and then the conductive composition containing the silicone resin is cured. Examples of the substrate include an alumina substrate, a glass epoxy substrate, a paper phenol substrate, and a paper epoxy substrate.

Another embodiment of the electrode forming step includes an electrode forming step (5) in the case where the electrode-forming body for electronic components is a film. The electrode forming step (5) includes at least a step of forming a conductive resin layer on the film. The method for forming the conductive resin layer is not particularly limited, and examples thereof include a method in which a conductive resin composition containing a silicone resin is applied by screen printing, inkjet printing, or dispenser printing, and then the conductive composition containing the silicone resin is cured. Examples of the film include a polyimide film and a PET film.

The specific resistance of the conductive resin layer obtained by using the conductive resin composition of the present invention is preferably 1000 $\mu\Omega\cdot$cm or less, more preferably 500 $\mu\Omega\cdot$cm or less, and particularly preferably 200 $\mu\Omega\cdot$cm or less.

The elongation percentage of the conductive resin layer obtained by using the conductive resin composition of the present invention is preferably 0.2% or more, and particularly preferably 0.3% or more. When the conductive resin layer having the elongation percentage in the above-described range is formed between the metal layer and the plating layer of the external electrode of the multilayer electronic component, cracks and interfacial peeling are less likely to occur in the connection portion between the substrate and the electronic component, and cracks are less likely to occur in the electronic component itself, thereby increasing the impact resistance of the electronic component. Therefore, it is possible to increase the impact resistance of the electronic component by forming the conductive resin composition of the present invention between the metal layer and the plating layer of the external electrode of the multilayer electronic component. The elongation percentage of the conductive resin layer is obtained by casting the conductive resin composition on a PET film to a thickness of 250 $\mu$m, curing the composition under the conditions of 200° C. for 60 minutes to obtain a cured film, then cutting the cured film into a 5 mm wide rectangle, measuring the length of a coating film when a tensile load of 9.8 N is applied in the long axis direction of the cured film using a viscoelasticity measuring apparatus (manufactured by Hitachi High-Tech Science Corporation, model number: DMA-7100), and calculating the ratio of the length extended when the load is applied to the length 10 mm before the load is applied.

The adhesion strength of the conductive resin layer obtained by using the conductive resin composition of the present invention is preferably 0.2 MPa or more, more preferably 0.3 MPa or more, particularly preferably 0.4 MPa or more. When the adhesion strength of the conductive resin layer is in the above range, the impact resistance of the electronic component can be increased. The adhesion strength of the conductive resin layer is measured by casting the conductive resin composition on a slide glass substrate to a thickness of 50 $\mu$m, placing an aluminum cylinder having a diameter of 3 mm thereon, curing the composition under the conditions of 200° C. for 60 minutes, pulling the composition in the vertical direction at a rate of 0.5 m/s using a bond tester (manufactured by SEISHIN TRADING CO., LTD, model number: SS-30WD), and measuring the value at break.

Since the conductive resin composition of the present invention uses a silicone resin as all or a part of the resin binder, the resulting conductive resin layer has higher moisture resistance than a conductive resin composition using an epoxy resin as the main component of the resin binder. In addition, the resulting conductive resin layer has higher heat resistance than a conductive resin composition containing a large amount of a butyral resin as the resin binder.

In many cases, when an epoxy resin is used alone, the cured product becomes too hard to satisfy requirements such as stress relaxation. Thus, it is difficult to obtain a conductive resin composition containing such an epoxy resin as a main component of a resin binder with suitable physical properties. Therefore, the conductive resin composition containing the epoxy resin as the main component of the resin binder needs to contain the butyral resin in order to impart flexibility. However, many butyral resins have low heat resistance, and in the case of a manufacturing method using the conductive resin composition containing the epoxy resin as the main component of the resin binder and butyral, it has been difficult to increase the heat resistance of the resulting conductive resin layer. On the other hand, in the conductive resin composition of the present invention, since the silicone resin is used as the resin binder and the silicone resin is contained in a predetermined amount, the resulting conductive resin layer easily satisfies the requirements of stress relaxation and the like. Therefore, according to the conductive resin composition of the present invention, it is possible to obtain a conductive resin layer having higher heat resistance than a conductive resin composition containing an epoxy resin as a main component and butyral as a resin binder.

Furthermore, the conductive resin layer obtained by using the conductive resin composition of the present invention has a smaller rate of change in moisture permeation amount with respect to change in film thickness than a conductive resin layer obtained from a conductive resin composition containing an epoxy resin component as a main component of a resin binder and butyral.

The thickness of the conductive resin layer formed on the object on which the conductive resin layer is to be formed varies depending on the type of electronic components. Since the moisture permeation amount increases when the film thickness decreases, it is necessary to compensate for the increase in the moisture permeation amount by increasing the resin ratio in the conductive resin layer or the like. Then, as the rate of change in the moisture permeation amount with respect to the change in the film thickness increases, the amount of increase in the moisture permeation amount decreases. Therefore, many measures for compensating the amount of increase in the moisture permeation amount are required. Therefore, if a conductive resin composition having a large rate of change in moisture permeation amount with respect to a change in film thickness of the resulting conductive resin layer, that is, a conductive resin composition containing an epoxy resin as a main component of a resin binder and containing butyral is used, restrictions on design of electronic components become large, and accordingly, restrictions on manufacturing in forming the conductive resin layer become large. On the other hand, if the rate of change in the moisture permeation amount with respect to the change in the film thickness of the resulting conductive resin layer is small, that is, the conductive resin composition of the present invention is used, the restriction on the design of the electronic component is small, and therefore, the restriction on the manufacture in forming the conductive resin layer can be reduced.

Hereinafter, the present invention will be described based on specific experimental examples, but the present invention is not limited thereto.

EXAMPLES

<Manufacture of Silver Powder>

First, silver powders 1 and 2 listed in Table 1 were prepared based on the spray pyrolysis method described in Japanese Patent Publication No. 63-31522. In other words, for the silver powder 1, an aqueous solution in which a silver salt was dissolved was subjected to spray pyrolysis, and the collected silver powder was classified to adjust a $D_{50}$ value.

Note that the obtained silver powder was measured with a laser diffraction particle size distribution analyzer to determine the 50% value in a volume-based integrated fraction ($D_{50}$). The specific surface area was also measured by the BET method.

<Method for Manufacturing Flaky Silver Powder>

A spherical silver powder was manufactured by the method described above, and the obtained spherical silver powder was pulverized by a ball mill using stearic acid as a lubricant to manufacture a flaky silver powder. In observation of SEM (scanning electron microscope) images, particle diameters and aspect ratios of 50 silver powders arbitrarily selected were measured to determine average values thereof. The specific surface area was also measured by the BET method.

<Silver-Coated Copper Flaky Powder>

Silver-coated copper powders were manufactured by coating 90 parts by mass of spherical copper powders (manufactured by Mitsui Mining & Smelting Co., Ltd., model number: MA-CO3K) with 10 parts by mass of silver. The obtained silver-coated copper powders were pulverized by a ball mill using palmitic acid as a lubricant to manufacture flaky silver-coated copper powders. In observation of SEM images, particle diameters and aspect ratios of 50 silver powders arbitrarily selected were measured to determine average values thereof. The specific surface area was also measured by the BET method.

<Preparation of Conductive Resin Composition>

The metal powder, the silicone resin, and the epoxy resin were blended at the blending ratios listed in Tables 1 and 2 to prepare conductive resin compositions.

Metal Powder 1

Spherical silver powder, $D_{50}$: 2.3 μm, specific surface area: 0.5 m²/g

Metal Powder 2

Flaky silver powder, aspect ratio: 30, number average particle size: 6.0 μm, specific surface area: 1.0 m²/g Metal Powder 3

Flaky silver-coated copper powder, aspect ratio: 20, $D_{50}$: 8.0 μm, specific surface area: 1.5 m²/g Silicone Resin 1

Thermosetting silicone resin, self-curable, manufactured by Shin-Etsu Chemical Co., Ltd., model number: ES-1001N, reactive functional group: hydroxy group, epoxy group Epoxy Resin 1

Thermosetting epoxy resin, manufactured by DIC Corporation, model number: EXA4816

Butyral Resin 1

Butyral resin, manufactured by Sekisui Chemical Co., Ltd., model number: KS-10

Silica Powder 1

Fumed silica, manufactured by Tokuyama Corporation, model number: HM-20L

Note that the amount of the resin in the following table refers to an amount of the resin itself excluding the solvent.

Examples 1 to 8

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 1, and metal powder 2 were mixed at a ratio listed in Table 1, and then kneaded using a three-roll mill (manufactured by INOUE MFG., INC.) to obtain a paste-like composition.

The obtained paste-like composition was diluted with benzyl alcohol to adjust the viscosity at 25° C. and a shear rate of 4 (1/s) to 30 Pa·s, and then the following evaluation was performed. The results are shown in Table 1.

Examples 9 to 13 and Comparative Examples 1 to 4

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 3, and the epoxy resin 1 were mixed at a ratio listed in Table 2, and then kneaded using a three-roll mill (manufactured by INOUE MFG., INC.) to obtain a paste-like composition.

The obtained paste-like composition was diluted with benzyl alcohol to adjust the viscosity at 25° C. and a shear rate of 4 (1/s) to 30 Pa·s, and then the following evaluation was performed. The results are shown in Table 2.

<Performance Evaluation>

(Viscosity Ratio)

The viscosity of the conductive resin composition was measured at 25° C. under the conditions of a shear rate of 0.4 (1/s) and a shear rate of 40 (1/s) using a rotational viscometer (manufactured by Brookfield Engineering Laboratories, Inc., model number: HADV-II+Pro). The ratio of the viscosity at a shear rate of 0.4 (1/s) to the viscosity at a shear rate of 40 (1/s) was calculated as the viscosity ratio.

(Phase Difference δ)

A rheometer (manufactured by TA Instruments Japan Inc., model number: AR2000) was used to perform measurement under the conditions of 25° C., an angular frequency of 1 Hz, and a strain of 1% with a parallel plate having a diameter of 40 mm to obtain a value of the phase difference δ of the conductive resin composition.

(Moisture Permeation Amount)

The conductive resin composition was cast on a PET film to a thickness of 250 μm and cured under the conditions of 200° C. for 60 minutes to obtain a cured film. The resulting cured film is cut into a circle of 7.5 mm in diameter and fixed with an adhesive so as to cover a 5 ml glass bottle containing 2 g of silica gel. Thereafter, the glass bottle was placed in a 750 ml vessel containing 100 ml of purified water so that the cured film did not come into contact with the purified water. The vessel was then sealed and placed in a dryer at 65° C.

to be left for 15 hours. The weight of the glass bottle was measured before and after the glass bottle was placed in the dryer, and the weight increase was defined as the moisture permeation amount. Samples having a moisture permeation amount of more than 160 mg were evaluated as "rating: 1, unacceptable, unusable, and extremely low moisture resistance," samples having a moisture permeation amount of more than 80.0 mg and 160 mg or less were evaluated as "rating: 2, unacceptable, unusable, and low moisture resistance," samples having a moisture permeation amount of more than 40.0 mg and 80.0 mg or less were evaluated as "rating 3: acceptable and usable," samples having a moisture permeation amount of more than 20.0 mg and 40.0 mg or less were evaluated as "rating 4: acceptable, usable, and high moisture resistance," and samples having a moisture permeation amount of 20.0 mg or less were evaluated as "rating 5: acceptable, usable, and extremely high moisture resistance."

(Elongation Percentage)

The conductive resin composition was cast on a PET film to a thickness of 250 μm and cured under the conditions of 200° C. for 60 minutes to obtain a cured film. The resulting cured film was cut into a 5 mm wide rectangle, and the length of the coating film when a tensile load of 9.8 N was applied in the long axis direction was measured using a viscoelasticity measuring apparatus (manufactured by Hitachi High-Tech Science Corporation, model number: DMA-7100). The ratio of the length extended when the load was applied to the length 10 mm before the load was applied was calculated and defined as the elongation percentage.

(Specific Resistance)

The conductive resin composition was cast on a slide glass substrate to a width of 1 cm, a length of 5 cm, and a thickness of 50 μm and cured under the conditions of 200° C. for 60 minutes to obtain a cured film. The resistance of the surface of the cured film was measured by a four-terminal method using a digital multimeter (manufactured by Keithley Instruments, KEITHLEY2002), and the specific resistance was calculated from the obtained value and the sample thickness.

(Adhesion Strength)

The conductive resin composition was cast on a slide glass substrate to a thickness of 50 μm and cured by placing an aluminum cylinder having a diameter of 3 mm thereon under the conditions of 200° C. for 60 minutes. The sample was pulled in the vertical direction at a rate of 0.5 m/s using a bond tester (manufactured by SEISHIN TRADING CO., LTD, model number: SS-30WD) to measure the value at break.

TABLE 1

| | Content (parts by mass) | | | | | Moisture | | | | |
| | Metal Powder | Metal Powder | Silicone Resin | Viscosity | Phase difference | Permeation amount | | Elongation percentage | Specific resistance | Adhesion strength |
| | 1 | 2 | 1 | ratio | δ | [mg] | Rating | [ % ] | [μΩ * cm] | [MPa] |
|---|---|---|---|---|---|---|---|---|---|---|
| Example 1 | 40.0 | 60.0 | 3.0 | 23.2 | 43 | 8.9 | 5 | 0.20 | 15 | 2.1 |
| Example 2 | 40.0 | 60.0 | 5.0 | 16.4 | 45 | 2.5 | 5 | 0.30 | 25 | 3.1 |
| Example 3 | 40.0 | 60.0 | 8.0 | 11.3 | 50 | 5.8 | 5 | 0.32 | 21 | 3.0 |
| Example 4 | 40.0 | 60.0 | 12.0 | 7.2 | 67 | 3.6 | 5 | 0.34 | 43 | 5.1 |
| Example 5 | 40.0 | 60.0 | 18.0 | 3.0 | 72 | 4.6 | 5 | 0.37 | 99 | 6.7 |
| Example 6 | 40.0 | 60.0 | 21.0 | 2.1 | 80 | 1.4 | 5 | 0.40 | 163 | 8.5 |
| Example 7 | 40.0 | 60.0 | 25.0 | 1.5 | 87 | 4.1 | 5 | 0.48 | 492 | 9.6 |
| Example 8 | 40.0 | 60.0 | 30.0 | 1.2 | 89 | 2.2 | 5 | 0.51 | 923 | 11.3 |

TABLE 2

| | Content (parts by mass) | | | Content ratio of silicone resin | | | Moisture | | | | |
| | Metal Powder | Silicone resin | Epoxy resin | | Viscosity | Phase difference | Permeation amount | | Elongation percentage | Specific resistance | Adhesion strength |
| | 3 | 1 | 1 | (%) | ratio | δ | [mg] | Rating | [%] | [μΩ * cm] | [MPa] |
|---|---|---|---|---|---|---|---|---|---|---|---|
| Example 9 | 100.0 | 18.0 | 0.0 | 100.0 | 9.3 | 60 | 7.7 | 5 | 0.31 | 157 | 3.1 |
| Example 10 | 100.0 | 17.1 | 0.9 | 95.0 | 9.9 | 58 | 13.4 | 5 | 0.31 | 159 | 3.2 |
| Example 11 | 100.0 | 16.2 | 1.8 | 90.0 | 10.8 | 56 | 31.2 | 4 | 0.31 | 160 | 3.3 |
| Example 12 | 100.0 | 14.4 | 3.6 | 80.0 | 12.2 | 54 | 56.4 | 3 | 0.32 | 165 | 3.5 |
| Example 13 | 100.0 | 13.0 | 5.0 | 72.2 | 13.0 | 51 | 73.4 | 3 | 0.36 | 170 | 3.8 |

TABLE 2-continued

| | Content (parts by mass) | | | Content ratio of | | | Moisture | | | | | |
| | Metal Powder | Silicone resin | Epoxy resin | silicone resin | Viscosity | Phase difference | Permeation amount | | Elongation percentage | Specific resistance | Adhesion strength |
| | 3 | 1 | 1 | (%) | ratio | δ | [mg] | Rating | [%] | [μΩ * cm] | [MPa] |
| Comparative Example 1 | 100.0 | 12.0 | 6.0 | 66.7 | 14.4 | 50 | 125.6 | 2 | 0.39 | 182 | 3.9 |
| Comparative Example 2 | 100.0 | 9.0 | 9.0 | 50.0 | 15.9 | 49 | 105.9 | 2 | 0.34 | 209 | 4.4 |
| Comparative Example 3 | 100.0 | 6.0 | 12.0 | 33.3 | 21.2 | 46 | 100.1 | 2 | 0.36 | 222 | 4.7 |
| Comparative Example 4 | 100.0 | 0.0 | 18.0 | 0.0 | 40.3 | 40 | 323.3 | 1 | 0.38 | 493 | 5.0 |

Silicone resin content ratio: the content ratio (%) of the silicone resin to the total resin content in the conductive resin composition containing the silicone resin ((silicone resin/total resin content (silicone resin+resin other than silicone resin))× 100)

From the results of Table 1, it was found that in Examples 1 to 8, since the conductive resin layer having a small moisture permeation amount was obtained and the adhesion strength required for the conductive resin layer was obtained, it was possible to manufacture an electronic component having high moisture resistance.

In addition, from the results of Table 2, it was found that in Examples 9 to 13, since the conductive resin layer having a small moisture permeation amount was obtained and the adhesion strength required for the conductive resin layer was obtained, it was possible to manufacture an electronic component having high moisture resistance by using the conductive resin composition containing the silicone resin as compared with the case of using the conductive resin composition containing 33.3% by mass or more of the epoxy resin as the resin content.

Reference Example 14

A paste-like composition was obtained in the same manner as in Example 4. The obtained paste-like composition was diluted with benzyl alcohol to adjust the viscosity at 25° C. and a shear rate of 4 (1/s) to 30 Pa·s.

Next, the moisture permeability was evaluated in the same manner as described above except that the thickness in casting the conductive resin composition on the PET film was adjusted, and the film thickness of the cured film was as listed in Table 3. The results are shown in Table 3.

Comparative Example 5

TABLE 3

| | Film thickness [μm] | Moisture permeation amount [mg] |
| Reference Example 14 | 23 | 16.4 |
| | 43 | 9.0 |
| | 75 | 3.0 |

Examples 15 to 26

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 1, and the metal powder 2, the silica powder 1, and the benzyl alcohol were mixed at a ratio listed in Tables 5 and 6, and then kneaded using a three-roll mill (manufactured by INOUE MFG., INC.) to obtain a paste-like composition.

The obtained composition was diluted with benzyl alcohol to adjust the viscosity at 25° C. and a shear rate of 4 (1/s) to 40 Pa·s, and then the above evaluation was performed. The results are shown in Tables 5 and 6.

Examples 27 to 31

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 1, and metal powder 2 were mixed at a ratio listed in Table 7, and then kneaded using a three-roll mill (manufactured by INOUE MFG., INC.) to obtain a paste-like composition.

The obtained composition was diluted with benzyl alcohol to adjust the viscosity at 25° C. and a shear rate of 4 (1/s) to 40 Pa·s, and then the above evaluation was performed. The results are shown in Table 7.

Examples 32 to 34 and Comparative Example 6

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 1, the metal powder 2, and the epoxy resin 1 were mixed at a ratio listed in Table 8, and then kneaded using a three-roll mill (manufactured by INOUE MFG., INC.) to obtain a paste-like composition.

The obtained composition was diluted with benzyl alcohol to adjust the viscosity at 25° C. and a shear rate of 4 (1/s) to 30 Pa·s, and then the above evaluation was performed. The results are shown in Table 8.

(Evaluation of Applicability 1)
<Manufacture of Multilayer Electronic Component>
As the electrode-forming body, a substantially rectangular parallelepiped laminated body as shown in FIG. 1 having a length of 3.2 mm, a width of 2.5 mm, and a height of 2.5 mm was prepared in which a plurality of dielectric layers containing barium titanate and a plurality of internal electrodes containing nickel were laminated.

A conductive resin composition containing copper powder was applied to both end surfaces of the laminated body by a dip method in the longitudinal direction being the vertical direction, and then the laminated body was held for 10 minutes under the conditions of 150° C. in an air atmosphere. Thereafter, in a nitrogen atmosphere, the temperature was increased to 780° C. at a temperature increase rate of 50° C./min. After reaching 780° C., the temperature was held for 15 minutes to form copper terminals.

The conductive resin composition shown in Table 4 or Table 8 was applied to the copper terminals formed on both end surfaces of the laminated body by a dip method in the longitudinal direction being the vertical direction, and the applied conductive resin composition was cured by being held for 60 minutes under the conditions of 200° C. in an air atmosphere to form a conductive resin layer on the copper terminals.

Furthermore, a nickel plating layer was formed on the conductive resin layer, and a tin plating layer was formed on the nickel plating layer, thereby producing a multilayer ceramic capacitor as a multilayer electronic component.

<Evaluation of Manufacturability>

A cross-section along the vertical direction of the multilayer electronic component was observed with a SEM, and the thickness of the conductive resin layer at a corner portion of an end surface of the laminated body (end surface corner thickness) and the thickness of the conductive resin layer at an end surface portion of the laminated body (end surface thickness) were measured. In the corner portion of the laminated body, the length of a portion having the shortest distance from the boundary between the plating layer and the conductive resin layer to the boundary between the conductive resin layer and the base layer (copper terminal) was defined as the end surface corner thickness. In addition, in the end surface portion of the laminated body, the length of a portion having the longest distance from the boundary between the conductive resin layer and the plating layer to the boundary between the conductive resin layer and the base layer (copper terminal) was defined as the end surface thickness when a perpendicular line was drawn from the boundary between the conductive resin layer and the plating layer toward the laminated body. Samples having an end surface corner thickness of less than 2.5 μm and/or an end surface thickness of more than 300 μm were evaluated as "rating: 1, unacceptable, unusable, and poor in manufacturability," samples having an end surface corner thickness of 5.0 μm or more and an end surface thickness of 200 μm or less were evaluated as "rating: 3, acceptable, usable, and excellent in manufacturability," and the other samples were evaluated as "rating: 2, acceptable, usable, and good in manufacturability."

The results of the shape of the conductive resin layers were as shown in Table 4 or 8.

(Evaluation of Applicability 2)

<Manufacture of Solid Electrolytic Capacitor>

As the electrode-forming body, a cathode-forming body composed of a substantially rectangular anode made of tantalum and having a length of 0.5 mm, a width of 3.7 mm and a height of 5.4 mm, and a dielectric layer made of tantalum pentoxide formed on the surface of the anode were prepared.

After the solid electrolyte layer was formed on the cathode-forming body and the carbon layer was formed on the solid electrolyte layer, the conductive resin composition shown in Table 5 or 6 was applied on the carbon layer by a dip method in the height direction being the vertical direction, and the applied conductive resin composition was cured by being held for 60 minutes under the conditions of 170° C. in the air atmosphere to form a conductive resin layer.

Thereafter, it was connected to a terminal, and a resin outer layer was formed by a resin molding method to produce a tantalum capacitor as a solid electrolytic capacitor.

<Evaluation of Manufacturability>

The horizontal cross section of the solid electrolytic capacitor was observed with an SEM, and the thickness of the conductive resin layer at the corner portion of the side surface of the cathode-forming body (side surface corner thickness) and the thickness of the conductive resin layer at the side surface portion of the cathode-forming body (side surface thickness) were measured. In the corner portion of the cathode-forming body, the length of the portion having the shortest distance from the boundary between the resin outer layer and the conductive resin layer to the boundary between the conductive resin layer and the base layer (cathode-forming body) was defined as the side corner thickness. In addition, in the side surface portion of the cathode-forming body, the length of the portion having the longest distance from the boundary between the resin outer layer and the conductive resin layer to the boundary between the conductive resin layer and the base layer (cathode-forming body) was defined as the side surface thickness. Samples having a side surface corner thickness of 5 μm or more and 20 μm or less were evaluated as "rating: 3, acceptable, usable, and excellent in manufacturability," samples having a side surface corner thickness of less than 2.5 μm and/or a side surface thickness of more than 40 μm were evaluated as "rating: 1, unacceptable, unusable, and poor in manufacturability," and the other samples were evaluated as "rating: 2, acceptable, usable, and good in manufacturability." The results of the shape of the conductive resin layers were as shown in Table 5 or 6.

(Evaluation of Applicability 3)

<Formation of Conductive Resin Layer by Screen Printing>

An alumina substrate (1 inch square) was prepared. On this substrate, the conductive composition shown in Table 7 was screen-printed with a line width of 150 μm, and the printed conductive composition was cured by being held for 60 minutes under the conditions of 200° C. in an air atmosphere to form a conductive resin layer.

<Evaluation of Shape of Conductive Resin Layer>

After the formation of the conductive resin layer, samples having good shape without bleeding or thin spots were evaluated as "rating: 3, usable, acceptable, and excellent in formability," samples having slight bleeding or thin spots but being useable were evaluated as "rating: 2, acceptable, usable", and samples having remarkable bleeding or thin spots and being unusable were evaluated as "rating: 1, unacceptable, unusable, and poor in formability." The results of the shape of the conductive resin layers were as shown in Table 7.

TABLE 4

| Test No. | Conductive composition | Content (parts by mass) Metal Powder 1 | Metal Powder 2 | Silicone Resin 1 | Viscosity ratio | Phase difference δ | Shape (Rating) |
|---|---|---|---|---|---|---|---|
| 1 | Example 1 | 40.0 | 60.0 | 3.0 | 23.2 | 43 | 1 |
| 2 | Example 2 | 40.0 | 60.0 | 5.0 | 16.4 | 45 | 2 |
| 3 | Example 3 | 40.0 | 60.0 | 8.0 | 11.3 | 50 | 3 |
| 4 | Example 4 | 40.0 | 60.0 | 12.0 | 7.2 | 67 | 3 |
| 5 | Example 5 | 40.0 | 60.0 | 18.0 | 3.0 | 72 | 3 |
| 6 | Example 6 | 40.0 | 60.0 | 21.0 | 2.1 | 80 | 3 |
| 7 | Example 7 | 40.0 | 60.0 | 25.0 | 1.5 | 87 | 2 |
| 8 | Example 8 | 40.0 | 60.0 | 30.0 | 1.2 | 89 | 1 |

TABLE 5

| Test No. | Conductive composition | Content (parts by mass) Metal Powder 1 | Metal Powder 2 | Silicone Resin 1 | Silica powder 1 | Viscosity ratio | Phase difference δ | Moisture Permeation amount [mg] | Rating | Elongation percentage [%] | Specific resistance [μΩ * cm] | Adhesion strength [MPa] | Shape (Rating) |
|---|---|---|---|---|---|---|---|---|---|---|---|---|---|
| 9 | Example 15 | 40.0 | 60.0 | 5.0 | 3.0 | 54.9 | 32 | 74.2 | 3 | 0.24 | 880 | 2.1 | 2 |
| 11 | Example 16 | 40.0 | 60.0 | 5.0 | 2.0 | 47.1 | 37 | 27.7 | 4 | 0.23 | 652 | 2.3 | 3 |
| 13 | Example 17 | 40.0 | 60.0 | 5.0 | — | 23.2 | 41 | 8.9 | 5 | 0.28 | 23 | 2.8 | 3 |
| 14 | Example 18 | 40.0 | 60.0 | 8.0 | — | 14.1 | 47 | 12.2 | 5 | 0.31 | 21 | 3.9 | 3 |
| 15 | Example 19 | 40.0 | 60.0 | 12.0 | — | 9.8 | 62 | 9.1 | 5 | 0.32 | 28 | 6.1 | 3 |
| 16 | Example 20 | 40.0 | 60.0 | 18.0 | — | 5.6 | 68 | 6.7 | 5 | 0.38 | 56 | 8.1 | 3 |
| 17 | Example 21 | 40.0 | 60.0 | 21.0 | — | 3.4 | 73 | 4.5 | 5 | 0.44 | 189 | 9.8 | 3 |
| 18 | Example 22 | 40.0 | 60.0 | 25.0 | — | 2.7 | 80 | 2.2 | 5 | 0.48 | 432 | 8.9 | 2 |
| 19 | Example 23 | 40.0 | 60.0 | 30.0 | — | 1.4 | 88 | 3.1 | 5 | 0.50 | 864 | 9.4 | 1 |

TABLE 6

| | Metal Powder 2 | Silicone Resin 1 | Viscosity ratio | Phase difference δ | Moisture Permeation amount [mg] | Rating | Shape (Rating) |
|---|---|---|---|---|---|---|---|
| Example 24 | 100.0 | 18.0 | 9.6 | 58 | 7.5 | 5 | 3 |
| Example 25 | 100.0 | 30.0 | 3.5 | 70 | 5.4 | 5 | 3 |
| Example 26 | 100.0 | 35.0 | 1.6 | 86 | 3.1 | 5 | 2 |

TABLE 7

| Test No. | Conductive composition | Content (parts by mass) Metal Powder 1 | Metal Powder 2 | Silicone Resin 1 | Viscosity ratio | Phase difference δ | Moisture Permeation amount [mg] | Rating | Shape (Rating) |
|---|---|---|---|---|---|---|---|---|---|
| 20 | Example 27 | 40.0 | 60.0 | 3.0 | 23.2 | 43 | 8.9 | 5 | 2 |
| 21 | Example 28 | 40.0 | 60.0 | 5.0 | 16.4 | 45 | 2.5 | 5 | 3 |

TABLE 7-continued

| | | Content (parts by mass) | | | | | Moisture | | |
| Test | Conductive | Metal Powder | Metal Powder | Silicone Resin | Viscosity | Phase difference | Permeation amount | | Shape |
| No. | composition | 1 | 2 | 1 | ratio | δ | [mg] | Rating | (Rating) |
|---|---|---|---|---|---|---|---|---|---|
| 22 | Example 29 | 40.0 | 60.0 | 8.0 | 11.3 | 50 | 5.8 | 5 | 3 |
| 23 | Example 30 | 40.0 | 60.0 | 18.0 | 3.0 | 72 | 4.6 | 5 | 3 |
| 24 | Example 31 | 40.0 | 60.0 | 28.0 | 1.4 | 88 | 2.7 | 5 | 2 |

TABLE 8

| | Content (parts by mass) | | | | Moisture | | | | | |
| | Metal Powder | Metal Powder | Silicone Resin | Epoxy resin | Permeation amount | | Elongation percentage | Specific resistance | Adhesion strength | Shape |
| | 1 | 2 | 1 | 1 | [mg] | Rating | [%] | [μΩ * cm] | [MPa] | (Rating) |
|---|---|---|---|---|---|---|---|---|---|---|
| Comparative Example 6 | 100.0 | 0.0 | 9.6 | 2.4 | 92.5 | 2 | 0.34 | 215 | 9.5 | 1 |
| Example 32 | 80.0 | 20.0 | 9.6 | 2.4 | 65.2 | 3 | 0.32 | 99 | 7.1 | 2 |
| Example 33 | 60.0 | 40.0 | 9.6 | 2.4 | 60.3 | 3 | 0.29 | 42 | 5.6 | 3 |
| Example 34 | 40.0 | 60.0 | 9.6 | 2.4 | 54.7 | 3 | 0.28 | 39 | 4.8 | 3 |

The invention claimed is:

1. A conductive resin composition, comprising a metal powder, a resin binder, and an organic solvent, wherein 20.0% by mass or more of the metal powder is a flaky metal powder, and 70.0% by mass or more of the resin binder is a silicone resin, wherein the silicone resin is a thermosetting silicone resin, wherein the thermosetting silicone resin has a hydroxy group and an epoxy group, and is cured by heating without using a curing agent, and a content of the resin binder is 2.5 to 35.0 parts by mass with respect to 100.0 parts by mass of the metal powder; and wherein when 1% strain is applied to the conductive resin composition at an angular frequency of 1 Hz, a value of a phase difference δ between the strain and a stress caused by the strain is in a range of 32 to 87° and/or a ratio of a viscosity of the conductive resin composition at a shear rate of 0.4 (1/s) to a viscosity thereof at a shear rate of 40 (1/s) is in a range of 1.5 to 60.0.

2. The conductive resin composition according to claim 1, wherein the silicone resin is cured through a dehydration reaction upon heating.

3. The conductive resin composition according to claim 1, wherein the flaky metal powder has an aspect ratio of 1.5 to 50.0.

4. The conductive resin composition according to claim 1, wherein the flaky metal powder has a number average particle diameter of 0.1 to 20.0 μm as measured using a scanning electron microscope (SEM).

5. The conductive resin composition according to claim 1, wherein the flaky metal powder has a specific surface area of 0.5 to 5.0 $m^2/g$.

6. The conductive resin composition according to claim 1, wherein the metal powder is at least one or more powders selected from: one or more powders of silver, copper, nickel, palladium, platinum, gold, and aluminum; a powder containing an alloy of one or more of these metals; a silver-coated copper powder; and a silver-coated nickel powder.

7. The conductive resin composition according to claim 1, wherein the metal powder is a powder containing silver and/or copper.

8. The conductive resin composition according to claim 1, which is for forming an external electrode of a multilayer electronic component or a cathode of a solid electrolytic capacitor.

9. The conductive resin composition according to claim 1, wherein:

the content of the resin binder is 5.0 to 25.0 parts by mass with respect to 100.0 parts by mass of the metal powder;

80.0% by mass or more of the resin binder is a silicone resin;

when the 1% strain is applied to the conductive resin composition at the angular frequency of 1 Hz, the value of a phase difference δ between the strain and the stress caused by the strain is in a range of 45 to 87°; and the ratio of a viscosity of the conductive resin composition at a shear rate of 0.4 (1/s) to a viscosity thereof at a shear rate of 40 (1/s) is in a range of 1.5 to 20.0.

10. The conductive resin composition according to claim 1, wherein the flaky metal powder has an aspect ratio of 1.5 to 50.0, the flaky metal powder has a number average particle diameter of 0.1 to 20.0 μm as measured using a scanning electron microscope (SEM), and the flaky metal powder has a specific surface area of 0.5 to 5.0 m²/g.

11. The conductive resin composition according to claim 1, wherein the flaky metal powder has an aspect ratio of 1.5 to 50.0, the flaky metal powder has a number average particle diameter of 0.1 to 20.0 μm as measured using a scanning electron microscope (SEM), and the flaky metal powder has a specific surface area of 0.5 to 5.0 m²/g.

12. The conductive resin composition according to claim 1, wherein the flaky metal powder has an aspect ratio of 1.5 to 50.0, the flaky metal powder has a number average particle diameter of 0.1 to 20.0 μm as measured using a scanning electron microscope (SEM), and the flaky metal powder has a specific surface area of 0.5 to 5.0 m²/g.

13. The conductive resin composition according to claim 6, wherein the flaky metal powder has an aspect ratio of 1.5 to 50.0, the flaky metal powder has a number average particle diameter of 0.1 to 20.0 μm as measured using a scanning electron microscope (SEM), and the flaky metal powder has a specific surface area of 0.5 to 5.0 m²/g.

14. The conductive resin composition according to claim 2, wherein the flaky metal powder has an aspect ratio of 1.5 to 50.0, the flaky metal powder has a number average particle diameter of 0.1 to 20.0 μm as measured using a scanning electron microscope (SEM), and the flaky metal powder has a specific surface area of 0.5 to 5.0 m²/g.

15. The conductive resin composition according to claim 1, wherein a moisture permeation amount is 80.0 mg or less as determined in a moisture permeation amount measurement test by:

casting the conductive resin composition on a PET film to a thickness of 250 μm and curing the conductive resin composition at 200° C. for 60 minutes to form a cured film;

cutting the cured film into a circle of 7.5 mm in diameter and fixing the circle with an adhesive so as to cover a 5 ml glass bottle containing 2 g of silica gel;

placing the glass bottle in a 750 ml vessel containing 100 ml of purified water so that the cured film does not come into contact with the purified water;

sealing the vessel and placing the vessel in a dryer at 65° C. for 15 hours; and calculating the moisture permeation amount by the following equation (1):

moisture permeation amount (weight increase)
=weight of the glass bottle after being placed in
the dryer–weight of the glass bottle before
being placed in the dryer    (1).

\* \* \* \* \*